(12) United States Patent
Roy et al.

(10) Patent No.: US 8,457,454 B1
(45) Date of Patent: Jun. 4, 2013

(54) OPTICAL SUBSTRATE CHIP CARRIER

(75) Inventors: Subhash Roy, Lexington, MA (US); Igor Zhovnirovsky, Newton, MA (US)

(73) Assignees: Applied Micro Circuits Corporation, San Diego, CA (US); Volex PLC, London (GB)

( * ) Notice: Subject to any disclaimer, the term of this patent is extended or adjusted under 35 U.S.C. 154(b) by 62 days.

(21) Appl. No.: 13/232,919

(22) Filed: Sep. 14, 2011

Related U.S. Application Data

(63) Continuation-in-part of application No. 12/900,401, filed on Oct. 7, 2010, now Pat. No. 8,057,106, and a continuation-in-part of application No. 12/862,614, filed on Aug. 24, 2010, now Pat. No. 8,061,904, which is a continuation-in-part of application No. 12/793,513, filed on Jun. 3, 2010, which is a continuation-in-part of application No. 12/784,849, filed on May 21, 2010, now Pat. No. 8,109,676, which is a continuation-in-part of application No. 12/756,087, filed on Apr. 7, 2010, now Pat. No. 8,109,678, which is a continuation-in-part of application No. 12/652,705, filed on Jan. 5, 2010, now Pat. No. 8,109,675, which is a continuation-in-part of application No. 12/581,799, filed on Oct. 19, 2009, now Pat. No. 8,113,721, which is a continuation-in-part of application No. 12/483,616, filed on Jun. 12, 2009.

(51) Int. Cl.
*G02B 6/12* (2006.01)
*G02B 6/32* (2006.01)
*G02B 6/36* (2006.01)
*G02B 6/10* (2006.01)

(52) U.S. Cl.
USPC ............... 385/14; 385/33; 385/88; 385/93; 385/129

(58) Field of Classification Search
USPC .............. 385/14, 129–131, 88, 89, 33, 92–94
See application file for complete search history.

(56) References Cited

U.S. PATENT DOCUMENTS

| | | | |
|---|---|---|---|
| 7,309,174 B2 * | 12/2007 | Farr | 385/94 |
| 7,410,306 B2 * | 8/2008 | Wipiejewski | 385/88 |
| 2006/0239621 A1 * | 10/2006 | Lo et al. | 385/88 |

* cited by examiner

*Primary Examiner* — Brian Healy
*Assistant Examiner* — Hung Lam
(74) *Attorney, Agent, or Firm* — Woodcock Washburn LLP

(57) ABSTRACT

An optical multi-chip module (MCM) is provided. A printed circuit board (PCB) overlies a package bottom and has die contact regions, each having at least one electrical interface. A first die contact region is formed in a PCB top surface recess, and an optical component die has a bottom surface with an area about matching the PCB top surface recess. The optical component die has an optical port with microlens. An electrical component die has a bottom surface with at least one electrical interface connected to the second die electrical interface, which is connected to the first die electrical interface via a PCB trace. A wire bond is connected between the electrical component die and a package interconnection lead. A cover assembly connector has an optical port with a microlens, configured to communicate with the optical component die optical port, and a fiber port to accept an optical fiber.

10 Claims, 4 Drawing Sheets

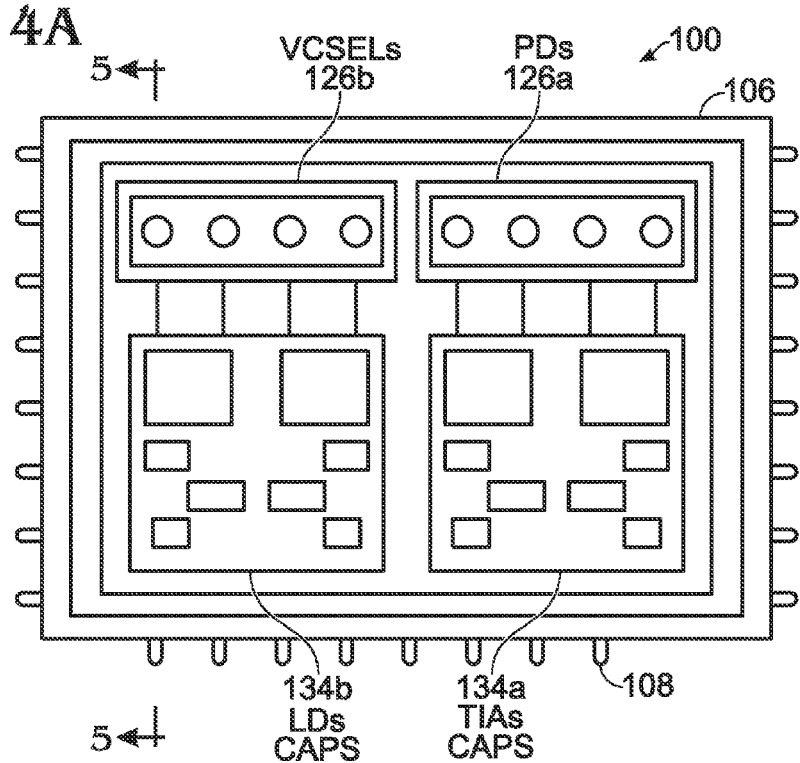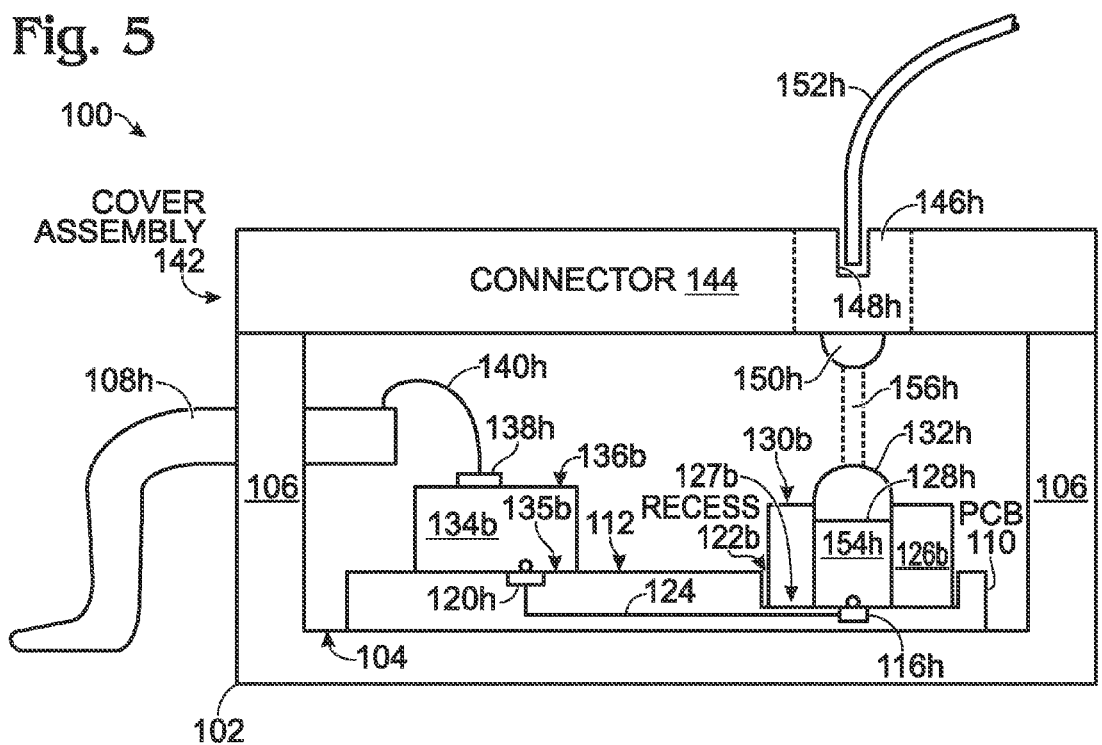

OPTICAL SUBSTRATE CHIP CARRIER

RELATED APPLICATIONS

This application is a Continuation-in-Part of a application entitled, FIBER OPTIC CONNECTOR MICROLENS WITH FOCAL PLANE ALIGNING FIBER TRAP, invented by Igor Zhovnirovsky et al., Ser. No. 12/900,401, filed Oct. 7, 2010 now U.S. Pat. No. 8,057,106;

This application is a Continuation-in-Part of a application entitled, FIBER OPTIC CONNECTOR MICROLENS WITH SELF-ALIGNING OPTICAL FIBER CAVITY, invented by Reid Greenberg et al., Ser. No. 12/862,614, filed Aug. 24, 2010 now U.S. Pat. No. 8,061,904;

which is a Continuation-in-Part of a pending application entitled, FIBER OPTIC JACK WITH HIGH INTERFACE MISMATCH TOLERANCE, invented by Igor Zhovnirovsky et al., Ser. No. 12/793,513, filed Jun. 3, 2010;

which is a Continuation-in-Part of a application entitled, FIBER OPTIC CABLE WITH HIGH INTERFACE MISMATCH TOLERANCE, invented by Igor Zhovnirovsky et al., Ser. No. 12/784,849, filed May 21, 2010 now U.S. Pat. No. 8,109,676;

which is a Continuation-in-Part of a application entitled, PUNCH-DOWN FIBER OPTIC CABLE TERMINATION, invented by Igor Zhovnirovsky, et al., Ser. No. 12/756,087, filed Apr. 7, 2010 now U.S. Pat. No. 8,109,678:

which is a Continuation-in-Part of a application entitled, CONNECTOR JACK PROCESSING BACKCAP, invented by Igor Zhovnirovsky et al., Ser. No. 12/652,705, filed Jan. 5, 2010 now U.S. Pat. No. 8,109,675:

which is a Continuation-in-Part of a application entitled, OFF-AXIS MISALIGNMENT COMPENSATING FIBER OPTIC CABLE INTERFACE, invented by Igor Zhovnirovsky et al., Ser. No. 12/581,799, filed Oct. 19, 2009 now U.S. Pat. No. 8,113,721;

which is a Continuation-in-Part of a pending application entitled, FIBER OPTIC CABLE INTERFACE, invented by Igor Zhovnirovsky et al., Ser. No. 12/483,616, filed Jun. 12, 2009. All the above-referenced applications are incorporated herein by reference.

BACKGROUND OF THE INVENTION

1. Field of the Invention

This invention generally relates to integrated circuit (IC) fabrication and, more particularly to an optical substrate chip carrier.

2. Description of the Related Art

As noted in Wikipedia, common commercial circuit packaging includes the dual in-line package (DIP), pin grid array (PGA), ball grid array (BGA), leadless chip carrier (LCC) packages, and surface mount package with leads formed as either a gull-wing or J-lead. A surface mount package typically occupies an area about 30-50% less than an equivalent DIP, with a typical thickness that is 70% less. This package has "gull wing" leads protruding from the two long sides and a lead spacing of 0.050 inches. In a Flip-chip Ball Grid Array (FCBGA) package the die is mounted upside-down (flipped) and connects to the package balls via a package substrate that is similar to a printed-circuit board rather than by wires. When multiple dies are combined on a small substrate, its called an MCM, or Multi-Chip Module. A big MCM may be considered to be a small printed circuit board (PCB).

Individual components or surface mount devices (SMDs) may be placed on a die or printed circuit board (PCB) using a SMT (surface mount technology) component placement system, commonly called a pick-and-place machine. Generally, these robotic machines are used to place surface-mount devices (SMDs) onto a PCB. They are used for high speed, relatively high precision placing of broad range of electronic components, like capacitors, resistors, integrated circuits onto PCBs. These systems normally use pneumatic suction nozzles, attached to a plotter-like device to allow the nozzle head to be accurately manipulated in three dimensions. Additionally, each nozzle can be rotated independently.

Wire bonding is the primary method of making interconnections between the leads of an IC package and the PCB during semiconductor device fabrication. Wire bonding can also be used to connect one PCB to another. Wire bonding is generally considered the most cost-effective and flexible interconnect technology, and is used to assemble the vast majority of semiconductor packages. Bond wires usually consist of one of the following materials: aluminum, copper, or gold. Wire diameters start at 15 µm and can be up to several hundred micrometers for high-powered applications. Junction size, bond strength, and conductivity requirements typically determine the most suitable wire size and material for a specific wire bonding application.

An optical component such as a laser diode or photodiode converts signals between the optical and electrical domains. Driver circuitry such as transimpedance amplifiers (TIAs) is typically used to convert electrical current generated by a photodiode into a (larger) voltage for subsequent processing. Likewise, the electrical interface of a laser diode is typically connected to laser driver circuitry to supply adequate current (i.e. voltage-to-current conversion).

There have been problems is scaling up the design of optical circuitry into an MCM that includes a plurality of optical components. The signals to-and-from the optical components and the driver circuitry operate at a high frequency, on the order of a 10 gigahertz bandwidth. At these frequencies the length of the wire bonds between the optical components and driver circuitry becomes critical. However, as more components are added to an IC, it becomes increasing difficult to locate a driver circuit directly adjacent to its corresponding optical component to minimize lead lengths. Likewise, even if the drivers can be located adjacent the optical components, the wirebonds from the drivers to the IC package leads must also be considered. Since the signals on these wirebonds operate at the same high frequencies, these lengths must also be short as short as possible. Ideally, these driver-to-package lead signals path lengths could be minimized if the electrical signals could be conducted from the drivers via a FCBGA interface, however this would require that the optical components be located on the same die as the drivers. Otherwise, the operation of soldering the FCBGA interface to a motherboard would likely cause the reflow of any solder contacts, such as wirebonds between the optical components and the drivers. Current technology is unable to practically fabricate optical components and drivers on the same die.

In an MCM with a plurality of optical components, it would be advantageous if the length of wirebonds between the optical driver circuit and MCM package leads could be minimized.

It would be advantageous if the driver-to-package lead wire bond lengths could be minimized by eliminating the wire bond connections between the optical components and drivers.

SUMMARY OF THE INVENTION

Accordingly, an optical multi-chip module (MCM) is provided. The MCM is made up of a leaded package with a bottom, sides, and interconnection leads extending through the sides. A printed circuit board (PCB) overlies the package bottom. The PCB top surface has a first die contact region with at least one electrical interface, and a second die contact region with at least one electrical interface. The first die contact region is formed in the PCB top surface recess, and at least one first die electrical interface is connected to a second die electrical interface via a trace (e.g., a transmission line) in the PCB. An optical component die has a bottom surface with an area about matching the PCB top surface recess, with at least one electrical interface connected to the first die electrical interface. The recess aids in the alignment of the optical paths. The optical component die has an optical port on a top surface and a microlens overlying the optical port.

An electrical component die has a bottom surface with at least one electrical interface connected to the second die electrical interface, and a top surface with at least one electrical interface. At least one wire bond is connected between an electrical component die top surface electrical interface and a package interconnection lead. A cover assembly overlies the package with a connector. The connector has an optical port with a microlens, configured to communicate with the optical component die optical port, and a fiber port to accept an optical fiber.

Additional details of the above-described MCM are provided below.

BRIEF DESCRIPTION OF THE DRAWINGS

FIGS. 4A and 4B are plan views of another variation of the MCM of FIG. 1.

FIG. 5 is a partial cross-sectional view of the MCM of FIG. 4A.

DETAILED DESCRIPTION

Figure 1A:
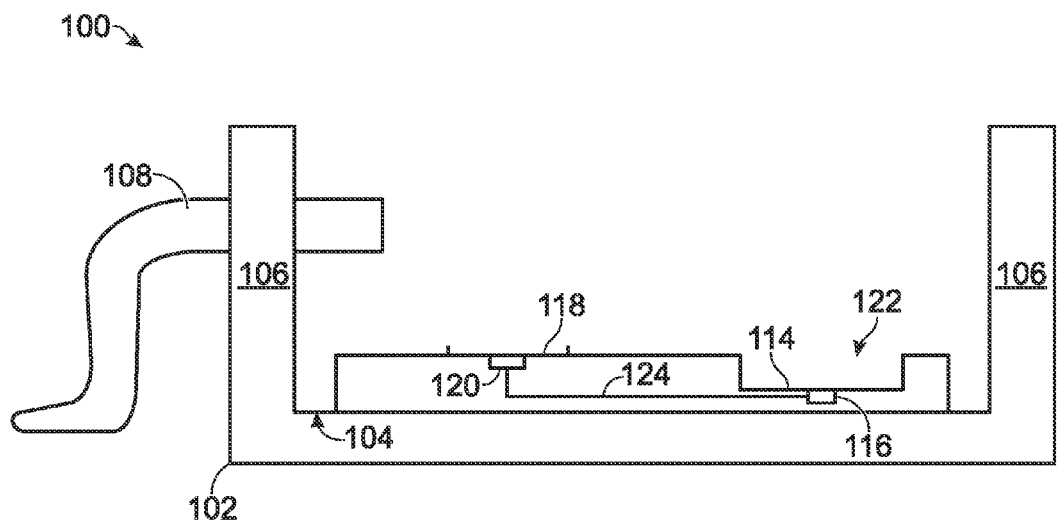
FIGS. 1A and 1B are partial cross-sectional views of an optical multi-chip module (MCM).
Figure 1B:
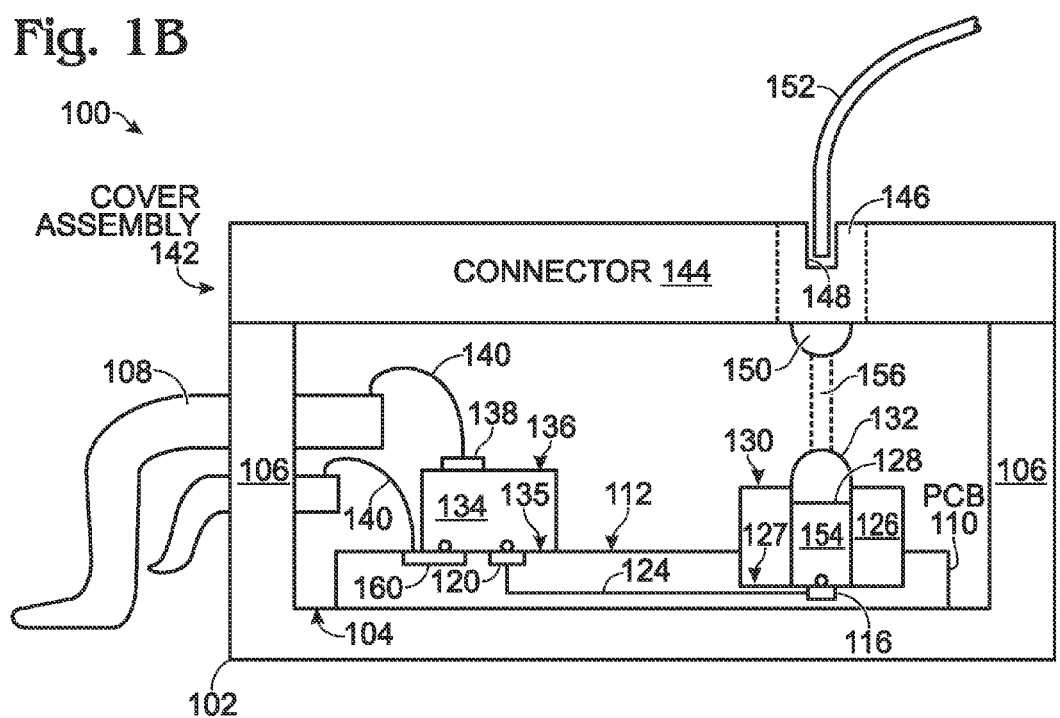

FIGS. 1A and 1B are partial cross-sectional views of an optical multi-chip module (MCM). The MCM 100 comprises a leaded package 102 comprising a bottom 104, sides 106, and interconnection leads 108 extending through the sides 106. For example, the interconnection leads 108 may be gull wing (J-lead) leads. A printed circuit board (PCB) 110 overlies the package bottom 104. The PCB 110 may be a material such as glass (silicate), silicon, GaAs, InP, plastic, or ceramic, and is not limited to any particular type of material.

The PCB 110 comprises a top surface 112 having a first die contact region 114 with at least one electrical interface 116, and a second die contact region 118 with at least one electrical interface 120. The first die contact region 114 is formed in a PCB top surface first recess 122. First die electrical interface 116 is connected to a second die electrical interface 120 via a trace 124 formed in the PCB 110. Because of the high frequency of the signals being communicated, the trace is typically enabled as a transmission line. Microstrip, stripeline, balanced line, lumped component, and waveguide transmission lines are widely known in the art. The transmission line has an impedance matched to the circuitry connected to interfaces 116 and 120.

A first optical component die 126 comprises a bottom surface 127 with an area about matching the PCB top surface first recess 122, and with at least one electrical interface connected to the first die electrical interface 116. The tolerance error between the (horizontal) width of the recess opening and the (horizontal) width of the bottom surface area is typically about 50 microns. In one aspect, the recess 122 has a depth of about 50 microns, with a typical tolerance of about 1 to 2 microns. However, the electrical and optical alignments can be maintained with a depth tolerance in the range of 25 to 100 microns. The optical component die 126 typically comprises an optical component 154 that may be either a photodiode or a laser diode such as a vertical-cavity surface-emitting laser (VCSEL). In one aspect, the lens on the VCSEL expands the beam width an order of magnitude (e.g., from 8 microns to 103 microns). In another aspect, the lens on photodiode (PD) doubles the effective aperture of photodiode (e.g., from 28 to 56 microns).

The optical component die 126 further comprises an optical port 128 on a top surface 130 and a microlens 132 overlying the optical port 128. A first electrical component die 134 comprises a bottom surface 135 with at least one electrical interface connected to the second die electrical interface 120, and a top surface 136 with at least one electrical interface 138. A one wire bond 140 is connected between the first electrical component die top surface electrical interface 138 and a package interconnection lead 108. Alternatively, the first electrical component die has an electrical interface connected to an electrical interface 160 on the PCB top surface 112, and the PCB electrical interface 160, or a PCB-connected trace, in connected by a wire bond 140 to an interconnection lead 108.

A cover assembly 142 overlies the package 102, comprising a connector 144 with an optical port 146 with a microlens 148, configured to communicate with the optical component die optical port 128, and a fiber port 150 to accept an optical fiber 152. In one aspect, the alignment of optical beam 156 between the optical element die optical interface 128 and the connector optical interface 148 is responsive to locating the optical element die 126 in the PCB top surface first recess 122.

Figure 2:
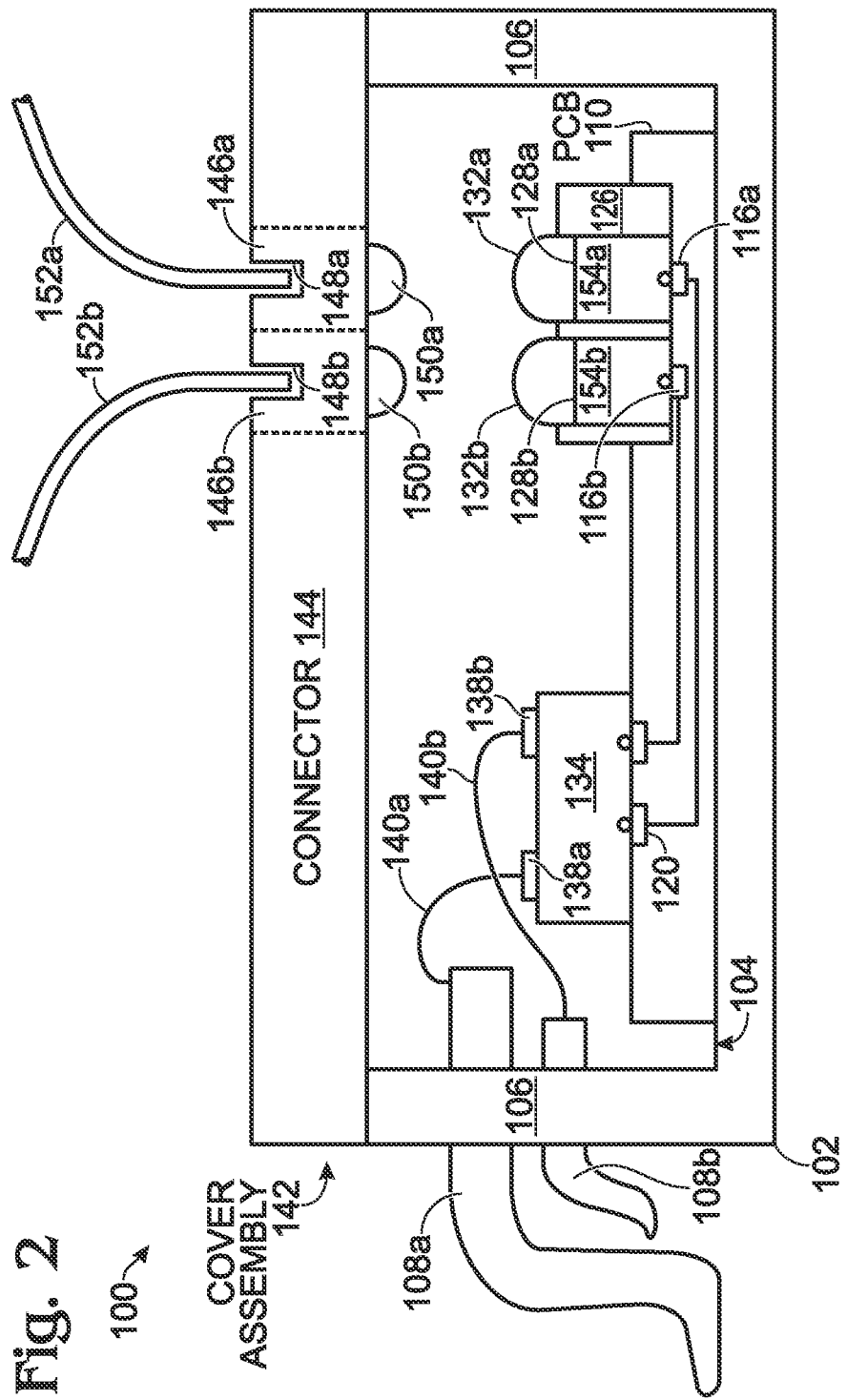
FIG. 2 is a partial cross-sectional view of the MCM with the first optical component die comprising a plurality of optical components.

FIG. 2 is a partial cross-sectional view of the MCM 100 with the first optical component die 126 comprising a plurality of optical components 154. Each optical component, 154a and 154b has an electrical interface connected to the first die electrical interface 114, an optical port 128a/128b, and a microlens 132a/132b overlying the optical port. Shown are two optical components, but the die is not limited to any particular number. Likewise, the connector 144 has a plurality of optical ports 146a/146b, each with a microlens 150a/150b, configured to communicate with a corresponding optical component die optical port 128a/128b, and a fiber port 148a/148b to accept an optical fiber 152a/152b.

Figure 3A:
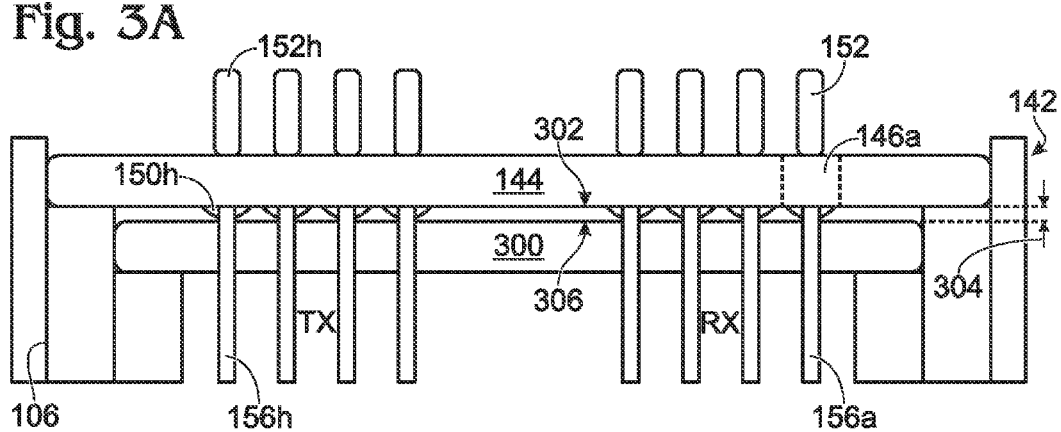
FIGS. 3A and 3B are partial cross-sectional views of a cover assembly variation.
Figure 3B:
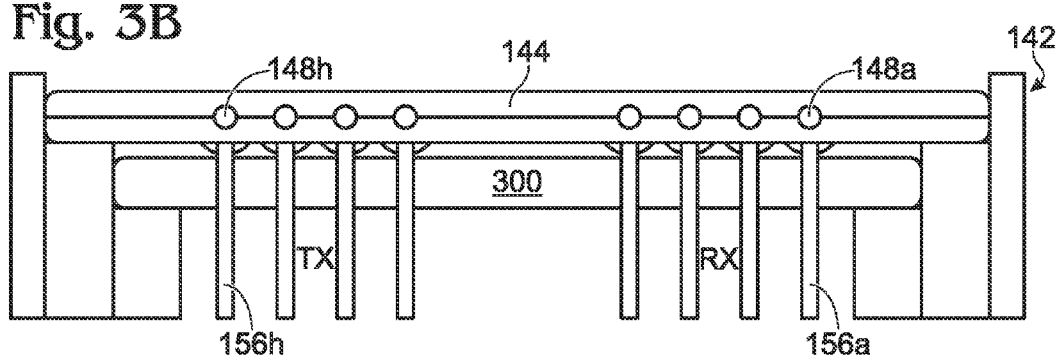

FIGS. 3A and 3B are partial cross-sectional views of a cover assembly variation. In this aspect the cover assembly 142 further comprises a lid 300 with a transparent region to pass optical signals 156 between the optical port of the optical component die (not shown) and the optical port 146 of the connector 144. The connector 144 may, in one aspect, be selectively engaged and disengaged from the MCM. As shown, each cover assembly microlens 150 is formed on a bottom surface 302 of the connector 144, in an air gap 304 between the connector bottom surface 302 and a top surface 306 of the lid 300. In FIG. 3A the optical path extends in a straight line into the faces of the optical fibers 152, so that the fiber extends vertically from the fiber interfaces in the connector. In FIG. 3B, the fiber is mated to the connector fiber interfaces 148 at a right angle with respect to optical path 156, and a mirrored surface (not shown) translates the optical beams to the interface 148, into the faces of the fiber optic lines.

Figure 4B:
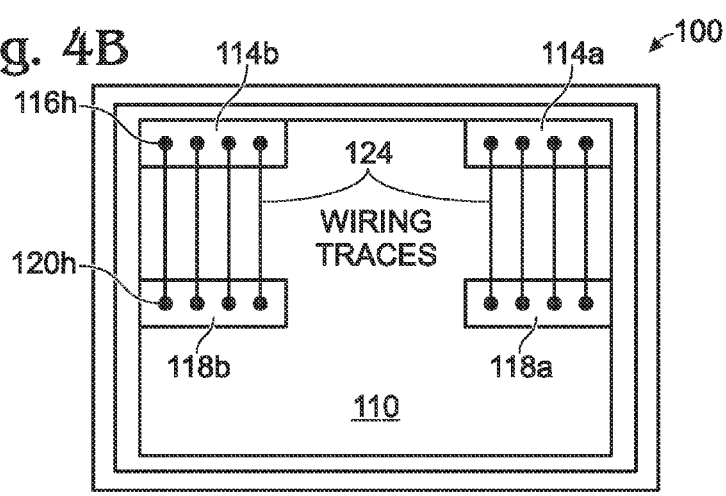

FIGS. 4A and 4B are plan views of another variation of the MCM of FIG. 1. In this aspect, the MCM includes a plurality of optical component dies and electrical component dies (as shown, two). Further, each optical component die includes a plurality of optical components (four are shown on each optical component die). In this example, the MCM further comprises a third die contact region 114b with at least one electrical interface 116h, and a fourth die contact region 118h with at least one electrical interface 120h. The third die contact region 114b is formed in a PCB top surface second recess which cannot be seen in this view (see FIG. 5), but is similar to the recess 122 shown in FIG. 1A. At least one third die electrical interface is connected to a fourth die electrical interface via a transmission line 124 formed in the PCB 110 (four are shown).

FIG. 5 is a partial cross-sectional view of the MCM of FIG. 4A. A second optical component die 126b comprises a bottom surface 127b with an area about matching the PCB top surface recess 122b, with an electrical interface connected to the third die electrical interface 116h. The optical component die 126b further comprises an optical port 128h on a top surface 130b and a microlens 132h overlying the optical port 128h. A second electrical component die 134h comprises a bottom surface 135b with an electrical interface connected to the fourth die electrical interface 120h, and a top surface 136b with at least one electrical interface 138h. A wire bond 140h is connected between a second electrical component the top surface electrical interface 138h and a package interconnection lead 108h. The connector 144 has an optical port 146h with a microlens 150h, configured to communicate with the second optical component die optical port 128h. Note: the MCM is not limited to any particular number of optical component dice, electrical component dice, of optical components per optical component die.

As shown in this example, one optical component die may be comprised of photodiodes to receive optical signals and the other optical component dies may be comprised of VCSELs for optical transmission. The electrical component die supporting the photodiodes may be comprised of components such as TIAs and capacitors. Likewise, the electrical component die supporting the VCSELS may be comprised of amplifiers and capacitors.

The concept behind the above-described design permits the easy alignment of optical components using semiconductor processing techniques (e.g., PCB recesses) to "pre-configure" placement points for key optical components. The PCB includes pre-wired high speed links to enable higher performance electrical connectivity. The design enables at least quasi-hermetic sealing.

As noted above, the PCB can be any basic substrate material that can be processed using conventional IC fabrication techniques. Such materials include silicon, GaAs, InP, and silicates (e.g., Borosilicate—Pyrex) to name just a few. The preconfigured wiring can be made with standard semiconductor wiring such as copper or Al. Also as noted above, the lead frame and package type may be based upon gull wing structures, although other package styles are possible. Further, the use of a lens on VCSEL and PD elements also acts to reduce tolerance requirements.

The PCB is the mounting point for components. It includes a wiring layer for interconnection of these components and pads that are wire bonded onto the plastic package. This PCB also has a set of pads that permit bond wires to be soldered on to it, to connect to the plastic chip carrier that contain the gull-wing pins for mounting the MCM onto a circuit board or a flex circuit. Alternatively as shown, the wire bonds may be connected directly to electrical interfaces on the electrical component die. The plastic chip carrier that houses the substrate and all the electronics, also contains lenses that are formed on top of the VCSELs and PDs.

This wiring layer is made from a semiconductor substrate (silicon—either bulk or silicon-on-insulator (SOI), GaAs, GaN, InP, etc.) and has copper traces for interconnect for the components that will be mounted on it such as VCSELs, PDs, capacitors, resistors, etc. There may also be wire bonding from the components to the substrate for some of the slower speed signals from the components.

The top of the lens protrudes through the cover. The cover can be manufactured of an optically correct material such as silicate glass or plastic. The cover may be sealed shut to create a hermetic or semi-hermitic seal all the way around the package including against the protruding lens. Alternately, lens can be glued onto the VCSELs or PDs. A second lens is part of the cover and an air gap between these lenses exists. A collimated beam between the lens is formed.

An optical MCM has been provided. Examples of particular layouts and materials have been presented to illustrate the invention. However, the invention is not limited to merely these examples. Other variations and embodiments of the invention will occur to those skilled in the art.

We claim:

1. An optical multi-chip module (MCM) comprising:
   a leaded package comprising a bottom, sides, and interconnection leads extending through the sides;
   a printed circuit board (PCB) overlying the package bottom wherein the PCB comprises a top surface having a first die contact region with a plurality of electrical interfaces, and a second die contact region with a plurality of electrical interfaces, where the first die contact region is formed in a PCB top surface first recess configured to receive an optical component die, and where the plurality of first die electrical interfaces is connected to the plurality of second die electrical interfaces via transmission lines formed in the PCB;
   a first optical component die comprising a bottom surface with an area about matching the PCB top surface first recess such that said first optical component die substantially fills said first recess when placed therein, and with a plurality of electrical interfaces connected to the first die electrical interfaces, the optical component die further comprising a plurality of optical ports on a top surface and a microlens overlying each optical port;
   a first electrical component die comprising a bottom surface with a plurality of electrical interfaces connected to the second die electrical interfaces, and a top surface with a plurality of electrical interfaces;
   a plurality of wire bonds connected between the plurality of first electrical component die top surface electrical interfaces and the package interconnection leads; and,
   a cover assembly overlying the package, comprising a connector with an optical port and a microlens configured to communicate with each optical component die optical port, and a plurality of fiber ports to accept optical fibers.

2. The MCM of claim 1 wherein the optical component die comprises optical components selected from a group consisting of a photodiode and a laser diode.

3. The MCM of claim 1 wherein the PCB is a material selected from a group consisting of glass (silicate), silicon, GaAs, InP, plastic, and ceramic.

4. The MCM of claim 1 wherein the cover assembly further comprises a lid with a transparent region to pass optical signals between the optical ports of the optical component die and the optical ports of the connector.

5. The MCM of claim 4 wherein the connector is configured to be selectively engaged and disengaged from the MCM.

6. The MCM of claim 4 wherein each microlens is formed on a bottom surface of the connector, in an air gap between the connector bottom surface and a top surface of the lid.

7. The MCM of claim 1 wherein an optical beam alignment between the optical element die optical interface and the connector optical interface is responsive to locating the optical element die in the PCB top surface first recess.

8. The MCM of claim 1 wherein the PCB further comprises a third die contact region with a plurality of electrical interfaces, and a fourth die contact region with a plurality of electrical interfaces, where the third die contact region is formed in a PCB top surface second recess, and where the plurality of third die electrical interfaces is connected to the plurality of fourth die electrical interfaces via transmission lines formed in the PCB;
- a second optical component die comprising a bottom surface with an area about matching the PCB top surface recess, and with a plurality of electrical interfaces connected to the third die electrical interfaces, the optical component die further comprising a plurality of optical ports on a top surface and a microlens overlying each optical port;
- a second electrical component die comprising a bottom surface with a plurality of electrical interfaces connected to the fourth die electrical interfaces, and a top surface with a plurality of electrical interfaces;
- a plurality of wire bonds connected between the second electrical component die top surface electrical interfaces and the package interconnection leads; and,
- wherein the connector has an optical port with a microlens configured to communicate with each second optical component die optical port.

9. The MCM of claim 1 wherein the leaded package interconnection leads are gull wing leads.

10. An optical multi-chip module (MCM) comprising:
- a leaded package comprising a bottom, sides, and interconnection leads extending through the sides;
- a printed circuit board (PCB) overlying the package bottom wherein the PCB comprises a top surface having a first die contact region with a plurality of electrical interfaces, and a second die contact region with a plurality of electrical interfaces, where the first die contact region is formed in a PCB top surface first recess configured to receive an optical component die, and where the plurality of first die electrical interfaces is connected to the plurality of second die electrical interfaces via transmission lines formed in the PCB;
- a first optical component die comprising a bottom surface with an area about matching the PCB top surface first recess such that said first optical component die substantially fills said first recess when placed therein, and with a plurality of electrical interfaces connected to the first die electrical interfaces, the optical component die further comprising a plurality of optical ports on a top surface and a microlens overlying each optical port;
- a first electrical component die comprising a bottom surface with a plurality of electrical interfaces connected to the second die electrical interfaces, and a plurality of electrical interfaces connected to the PCB;
- a plurality of wire bonds connected between electrical interfaces on the PCB top surface electrical interface and the package interconnection leads; and,
- a cover assembly overlying the package, comprising a connector with an optical port with a microlens, configured to communicate with each optical component die optical port, and a fiber port to accept a plurality of optical fibers.

* * * * *